Dec. 30, 1941.   A. F. HICKMAN   2,267,917
SPRING SUSPENSION FOR VEHICLES
Original Filed Feb. 27, 1934.   4 Sheets-Sheet 2
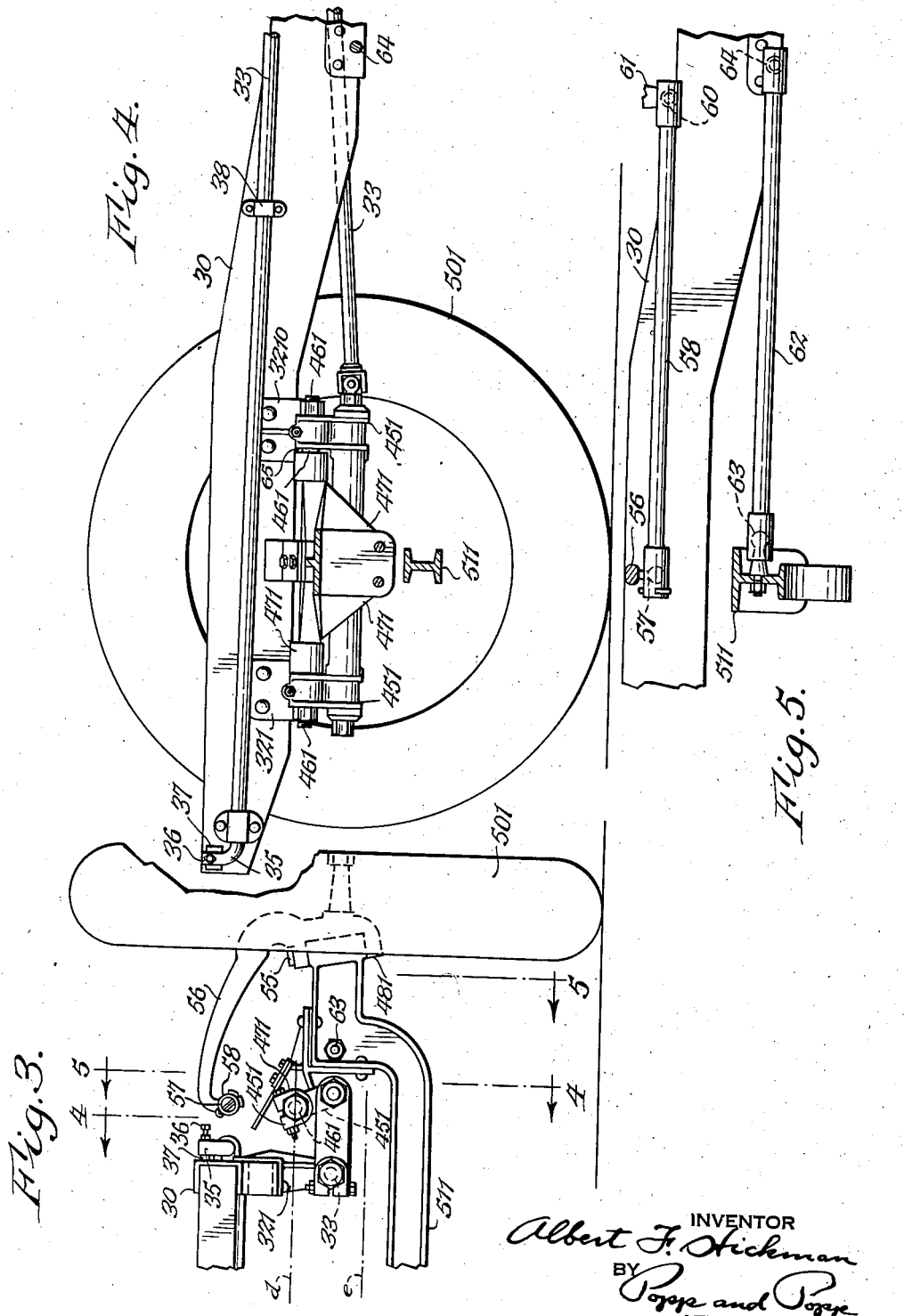
INVENTOR
Albert F. Hickman
BY
Popps and Popps
ATTORNEYS

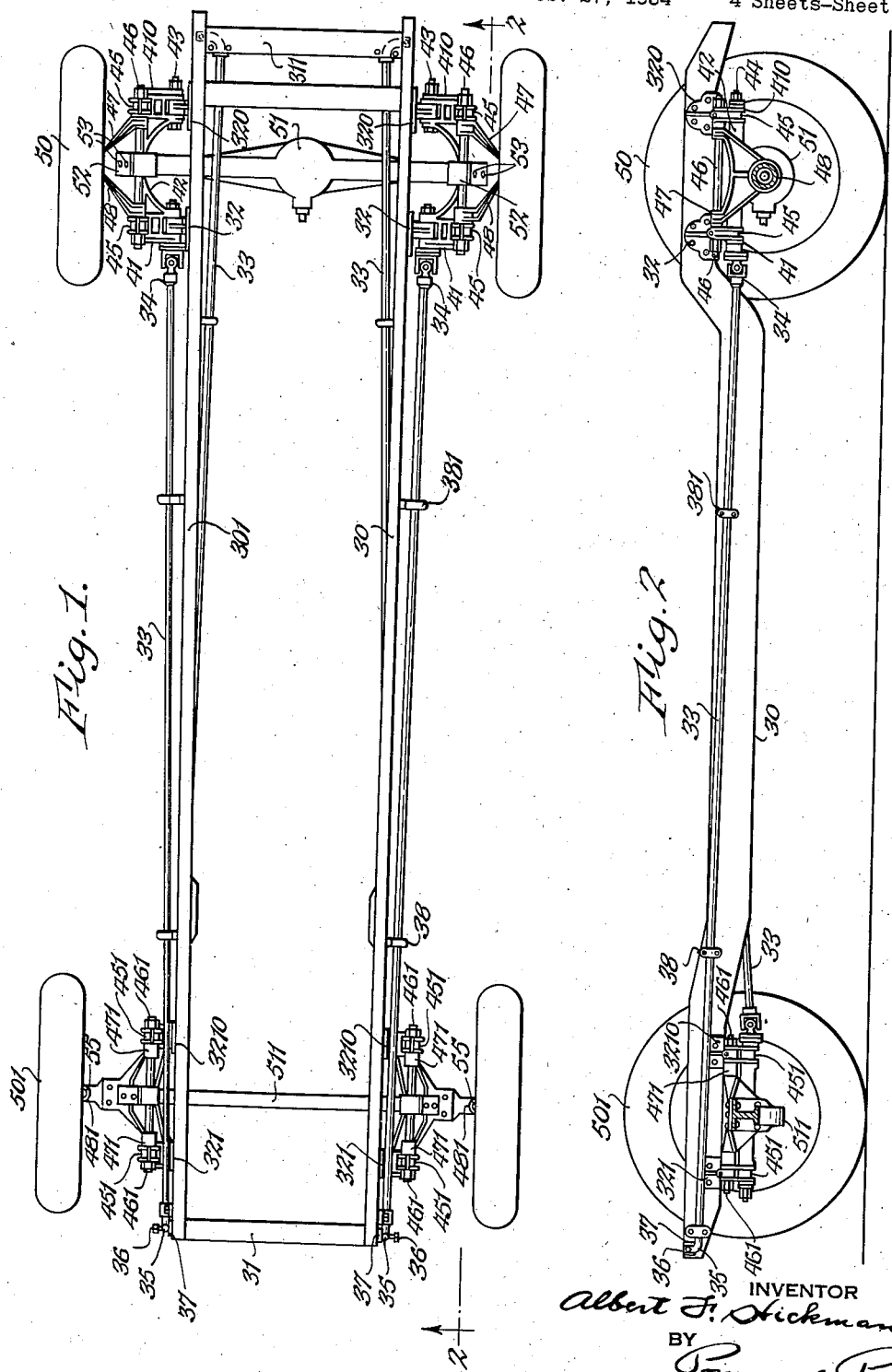

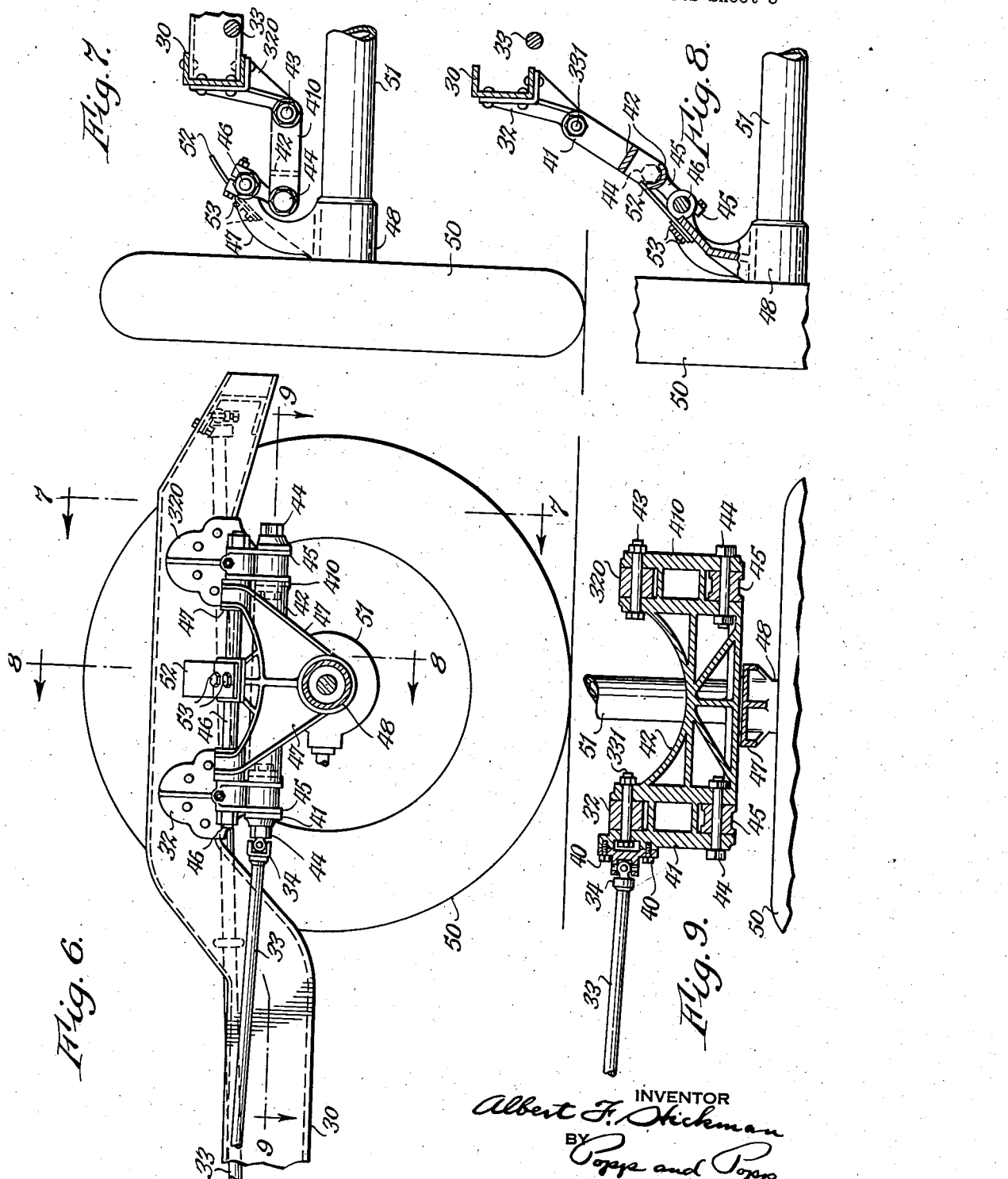
Dec. 30, 1941.  A. F. HICKMAN  2,267,917
SPRING SUSPENSION FOR VEHICLES
Original Filed Feb. 27, 1934   4 Sheets-Sheet 3
INVENTOR
Albert F. Hickman
BY
Popp and Popp
ATTORNEYS Dec. 30, 1941.    A. F. HICKMAN    2,267,917
SPRING SUSPENSION FOR VEHICLES
Original Filed Feb. 27, 1934    4 Sheets-Sheet 4
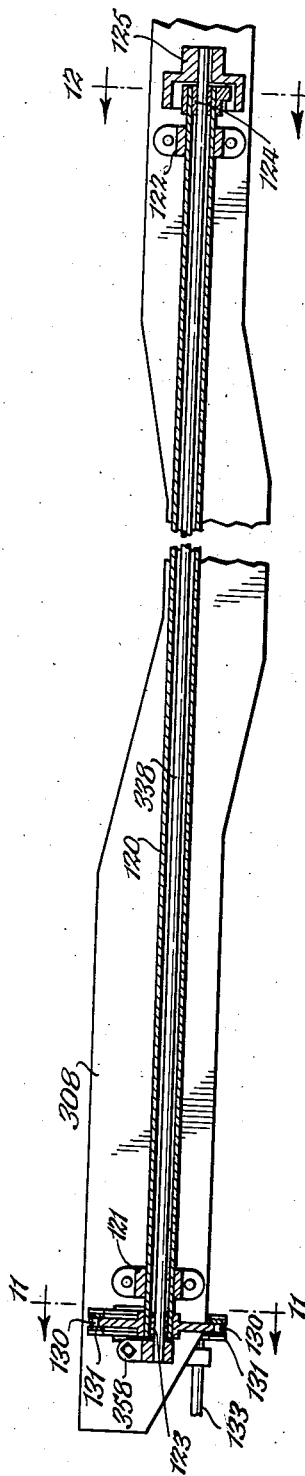
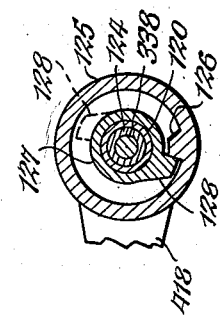
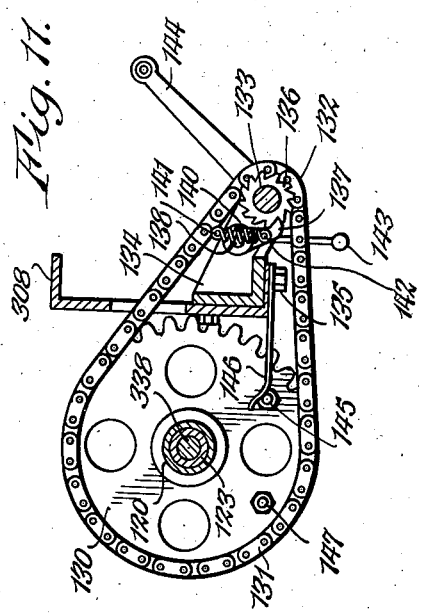
INVENTOR
Albert F. Hickman
BY
Pope and Pope
ATTORNEYS Patented Dec. 30, 1941

2,267,917

UNITED STATES PATENT OFFICE 2,267,917

SPRING SUSPENSION FOR VEHICLES

Albert F. Hickman, Eden, N. Y., assignor to Hickman Pneumatic Seat Co. Inc., Eden, N. Y., a corporation of New York Original applications February 27, 1934, Serial No. 713,161, and January 27, 1940, Serial No. 315,985. Divided and this application July 23, 1940, Serial No. 346,968

6 Claims. (Cl. 267—57)

This invention relates to a spring suspension for vehicles, and more particularly to a spring suspension for vehicles or portions of vehicles subjected to a relatively small variation in load, such as in the case of passenger automobiles, aeroplanes, and the front ends of trucks and busses or for vehicles having a large load variation, as in the rear ends of commercial highway trucks.

This application is a division of my copending applications Ser. No. 713,161, filed February 27, 1934 for Vehicle spring suspension, and Ser. No. 315,985, filed January 27, 1940, for Spring suspension for vehicles, and is more particularly directed to the form of the invention shown in Figs. 20, 21, and 22 of said first mentioned copending application, Ser. No. 713,161 and as also shown in Figs. 10, 11 and 12 of said second mentioned copending application Ser. No. 315,985, these figures being reproduced herein as Figs. 10, 11 and 12, respectively.

The principal objects of the invention are:
(1) To resiliently oppose both up and down vehicle wheel movement by a purely geometric resilient resistance instead of by an arithmetic or a partially arithmetic and partially geometric resilient resistance; (2) to reduce vehicle side sway any desired amount down to and including zero side sway, and even beyond to any desired amount of negative side sway; (3) to eliminate wheel tramp; (4) to considerably reduce the torsional forces to which the vehicle body is subjected, particularly as to the end of the body which is adjacent the axle being deflected; (5) to eliminate all frictional resistance except that incident to pivot bearings; (6) to entirely eliminate the squeaks and lubrication inconvenience of the conventional leaf spring; (7) to definitely limit the stress to which the resilient elements may be subjected; (8) to prevent the wheels from dragging the body down when said wheels move down beyond their normal range of movement; (9) to prevent any change of steering spindle caster even though the resilient members of the spring suspension are stretched past their elastic limit or become fractured, and, at the same time, to eliminate the need of torque rods; (10) to enable a spring suspension of this type being adjusted for maximum efficiency under different loads; (11) to considerably reduce side sway of the vehicle even if the axle pivot of the spring suspension is below the component of the sprung weight center of gravity of the companion axle; (12) to prevent the vehicle body from being subjected to lateral shocks as a consequence of lateral axle movement and to thereby also prevent "tire scuff"; (13) to prevent any of the parts of a spring suspension of this type from becoming locked in a past-dead-center position; (14) to enable the vehicle to be safely driven even if the resilient members of the spring suspension become fractured; and (15) to provide means for enabling a considerable torsional deflection of a torsion member even though the overall length of the torsion member is relatively short. Numerous other objects of the invention and practical solutions thereof are described in detail in the herein patent specification wherein:

In the accompanying drawings:

Fig. 1 is a diminutive, top plan of a passenger automobile chassis, provided with one form of my improved spring suspension.

Fig. 2 is a diminutive, vertical, longitudinal section thereof, taken on line 2—2, Fig. 1.

Fig. 3 is a fragmentary front end elevation thereof showing the front axle and associated parts.

Figs. 4 and 5 are fragmentary, longitudinal sections thereof, taken on correspondingly numbered lines of Fig. 3.

Fig. 6 is a fragmentary, vertical, longitudinal section through the rear end of the vehicle chassis, showing the rear axle and its associated parts.

Fig. 7 is a fragmentary, vertical, transverse section thereof, taken on line 7—7, Fig. 6.

Fig. 8 is a fragmentary, vertical, transverse section thereof, similar to Fig. 7 but taken on a line indicated by 8—8, in Fig. 6 and showing the parts in a different position from that of the other figures.

Fig. 9 is a fragmentary, horizontal section thereof, taken on line 9—9, Fig. 6.

Fig. 10 is a fragmentary, vertical, longitudinal section through the front end of a vehicle equipped with a modified form of compound torsion rod.

Figs. 11 and 12 are enlarged, vertical, transverse sections thereof, taken on correspondingly numbered lines of Fig. 10.

It is to be understood that similar characters of reference indicate like parts in the several figures of the drawings.

My invention may be embodied in various forms and in spring suspensions of different constructions, and the present embodiments thereof are to be regarded merely as a few of the setups which carry out the invention in practice. The subject matter of the present application is more particularly illustrated in Figs. 10-12.

In the form of the invention shown in Figs. 1–9, and in all the other forms of the invention, the main frame of the vehicle chassis is constituted in the usual and well known manner of a pair of longitudinally and substantially horizontal, side frame bars 30 and 301 which are connected at their front and rear ends repectively by the front and rear cross bars 31 and 311.

The entire vehicle chassis, together with its spring suspension, is constructed substantially symmetrically about a vertical longitudinal medial plane, and hence it is deemed sufficient to confine the following description almost entirely to the one (left) side of the vehicle, it being understood that a similar and substantially symmetrical arrangement is to be found on the other (right) side of the vehicle. Furthermore, the spring suspension at the rear end of the construction of Figs. 1–9 is somewhat simpler in construction than the front end, and will for that reason be described first.

Secured adjacent the rear end of the left, side, frame bar 30 is a pair of hangers 32 and 320. In the lower end of the forward hanger 32 (see Figs. 9, 7, and 6) is journaled a pivot pin 331 having a head and a nut similar in appearance to a bolt. Said pivot pin 331, in effect, is connected through a universal joint 34 with a torsion rod 33, the extreme forward end of the latter being shown as bent sharply upward to form the torque arm 35, as shown in Figs. 4, 3, 2 and 1. The upper end of said torque arm is shown as provided with an adjusting screw 36 (or other suitable adjusting means), the inner end of which bears against a pad 37 which may, if desired, be constructed of resilient material such as rubber, and is suitably secured to the adjacent vertical longitudinal face of the companion frame bar 30. The purpose of this adjustment screw 36 is to adjust the amount of torsional stress imposed upon its companion torsion rod 33.

It is to be understood that when such an adjustment is not desired (if it be desired to render the device more fool-proof, for instance), the spring suspension may be produced with sufficiently restricted torsional and other tolerances, and said adjusting screw 36 then entirely eliminated. Likewise, the pad 37 may, if desired, be also eliminated, a resilient connection at this point being, as a matter of fact, of very small intrinsic worth due to the fact that only under very unusual circumstances will conditions be such as to allow the torque arm 35 to move away from the frame bar 30. It is likewise obvious that the universal joint 34 may also be eliminated if the vehicle set-up is such as to permit the two sections of the torsion rod 33 to be disposed in axial alignment with each other.

If desired, the intermediate portions of the torsion rod 33 may, as shown, be suitably supported on the frame bar 30 by a pair of bearings 38 and 381, the latter being secured to said frame bars 30, 301 in any suitable manner.

The rear portion or head of the universal joint 34 is suitably flanged and detachably connected by cap screws 40 with the inner end of a bifurcated, front crank arm 41. This construction, in effect, rigidly connects the pivot pin 331 with said front crank arm 41. It is obvious that such a rigid connection may be effected in numerous ways other than in the particular manner illustrated. When the vehicle is normally loaded and at rest, this front crank arm 41 projects outwardly and substantially horizontally from the torsion rod 33, as shown in Figs. 7, 6, 9, 1 and 2. In this position the outer end of said front crank arm 41 is resiliently urged downwardly by the resilient stress imposed upon it by the torsional stress of its companion torsion rod 33.

As best shown in Fig. 9, the outer part of said bifurcated front crank arm 41 is connected on its outer rear side by an integral webbing 42 (or otherwise) with the outer part of a companion, bifurcated, rear crank arm 410. The inner end of this rear crank arm 410 is provided with a pivot pin 43 which is pivoted in the rear hanger 320 aforedescribed. The axis of this pivot pin 43 is coincident with the axis of the pivot pin 331 thereby permitting the two crank arms 41 and 410 (together with the integral webbing 42 which joins them) to swing in a vertical transverse plane about the common axis of said pivot pin 331 and of said pivot pin 43.

The outer ends of both of said crank arms 41 and 410 are bifurcated and are provided with a pair of horizontal pivot pins 44 which are axially in line with each other. The central portion of each pivot pin 44 is pivoted in the normally lower end of a companion link 45, which latter, in the normal or static, loaded position of the vehicle spring suspension shown in Figs. 7, 6, 9 extends upwardly and inwardly from said pivot pin 44.

The upper ends of the two links 45 are split (see Fig. 7) and are clamped upon the opposite ends of a relatively long, horizontal, longitudinal, axle-pivot shaft 46. By reason of the fact that said links 45 are both clamped at their upper ends to said axle-pivot shaft 46, the term links is not strictly accurate, but has been here used to avoid excessively clumsy phraseology and to more clearly distinguish said "links" from the crank arms 41, 410.

Between said links 45 is disposed an upstanding Y shaped trunnion 47, the upper, bifurcated arms of which are journaled on said axle-pivot shaft 46 while its lower central part or head is suitably secured by welding or otherwise to a companion wheel spindle 48. The latter has a rear, driving wheel 50 journaled thereon in the usual and well known manner. This spindle 48 constitutes one of the outer ends of the rear or drive axle (or axle housing) 51.

It is admitted that, in ordinary parlance, the outer portion of an automobile drive axle is not ordinarily denominated a spindle, but it is so defined in Webster's dictionary and it is necessary to assume some such definition as this if generic claims are to be drawn to cover the various forms of axles and wheel spindles illustrated herein. As far as the present spring suspension invention is concerned, there is no requirement that the driving axle 51 or any of the axles illustrated herein be constructed in one piece, inasmuch as each wheel spindle 48 is provided with its own individual spring suspension. Thence it is deemed proper to denominate each end of said drive axle 51 as a wheel spindle.

When said drive axle 51 drops approximately to its lowermost position relatively to the vehicle frame, as shown in Fig. 8, there is a possibility (unless such a contingency be positively prevented) that the crank arms 41, 410 and links 45 will be moved by inertia forces past their dead-center position, and become locked in this position. To prevent any such occurrence a flat, limiting spring 52 is secured to the central part of the trunnion 47 by means of cap screws 53 or otherwise, the outer portion of said limiting spring 52 being adapted to make contact (see Fig. 8) with the central, outer portion of the webbing 42 which forms an integral part of the two crank arms 41 and 410. This contact between said spring 52 and webbing 42 is initially made at a relatively long distance from the absolute dead center position and the parts then gently stopped at the final position of complete rest shown in Fig. 8 where the parts are shown as having almost, but not quite, arrived at an absolute dead-center position. It should be noted that in this connection, however, that, even if the parts move to or even beyond an absolute dead-center position, said parts are not likely to lock in this past-dead-center position because the resilient force of the torsion rod 33 is always urging the pivot pins 44 downwardly, and this factor may, in actual practice, be quite safely relied upon to "break" any possible dead-center locking.

When the axle 51 is forced upwardly relatively to the main frame from the position of Fig. 7 (or, vice versa, when the body under the influence of momentum, is forced downwardly relatively to said axle) the effective resilient opposing force of the torsion rod 33 increases at a geometric and not at an arithmetic rate. In this particular case, the geometric rate is of the accelerated increase type, in which increments of vertical movements of the axle are opposed by an accelerated rate of resilient resistance. This is primarily due to the progressive decrease in the effective lever arm of the crank arms 41, 410, as they swing upwardly and inwardly about the rear section of the torsion rod 33 and the pivot pin 43 as an axis of rotation. This action is also influenced by the varying angularity of the links 45 and the fact that increments of vertical displacement of the pivot pins 44 cause accelerated rates of increase in the angular displacement of the torsion rod 33. This latter is due to the fact that increments of vertical movement of said pivot pins 44 are not proportional to the accompanying increments of angular twist to which their companion torsion rod 33 is subjected.

This geometric action also occurs when the axle 51 moves downwardly a certain distance relatively to the frame bar 30 from the normal position of Fig. 7 to a position intermediate of the extreme position of Fig. 8. Throughout this particular movement, the geometric action is of the accelerated decrease type, i. e., as the axle passes through increments of downward movement, the rate of decrease of the resilient force tending to push said axle downward increases.

Thus, as the axle moves downwardly from the position of Fig. 7, the resilient force tending to push it downwardly decreases at an accelerated rate. Finally, at a position intermediate of Figs. 7 and 8, this downward pressure on the axle 51 becomes equal to zero. Then, as said axle continues to move downwardly beyond this intermediate point, the torque arm 35 is turned or rotated outwardly away from its pad 37, thereby relieving the torsion rod 33 of all torsional stress, thereby maintaining at zero the value of the resilient force interposed between the axle and the main frame. This condition continues until the axle has moved downwardly to its lowermost position as shown in Fig. 8. During this last mentioned downward axle movement, said axle, together with its wheels 50 and other unsprung weight, rests with its entire weight upon the ground (assuming, of course, the latter to be within reach) and hence without any of said unsprung weight urging the main vehicle frame downward. This means that, as far as vertical forces are concerned, said vehicle frame is, at this time, free to "float" along solely under the influence of gravity (plus whatever vertical momentum forces are present), this feature of the invention being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and body. Such a desirable result is quite different from that obtained from the conventional spring suspension in which the axle and the rest of the unsprung weight drags or jerks down the main frame whenever the strain imposed on the main springs is negative. In the present invention no such negative force, tending to pull the body downward, is possible.

The front or steering axle 511 of the vehicle of Figs. 1–9 is provided with a spring suspension analogous to that just described for the back axle 51. However, certain inherent characteristics of a front axle require certain modifications to the present invention when the same is to be applied to a front axle. In the case of the form of front axle 511 shown in Figs. 3, 4, 5, 1 and 2, for instance, a wheel spindle 481 having a wheel 501 journaled thereon is pivoted on a substantially vertical spindle pin 55 at each end of said front axle 511. The two wheel spindles 481 at opposite ends of said axle are assumed to be cross connected for steering purposes in the usual and well known manner. Extending horizontally inward from one of these spindles is a steering arm 56 connected by a universal joint 57 with the front end of the usual steering or drag link 58 (see Fig. 5). The rear end of the latter is connected, in the usual and well known manner, by a universal joint 60 with the lower end of a manually actuated steering lever 61.

It is important that the steering arm 56 be never moved relatively to the axle 511 as a consequence of any sort of up and down axle movement. Any such deleterious movement has been absolutely prevented by the construction here illustrated. A radius rod 62 is connected at its front end by a universal joint 63 with the front axle 511 and is connected at its rear end by a universal joint 64 with the side frame bar 30 of the main frame. This radius rod 62 has its universal joint pivots 63 and 64 spaced apart the same distance as the spacing apart of the universal joint pivots 57 and 60 of the drag link 58. In addition to this, the disposition of the various pivot centers is such that all planes intersecting the pivots 63 and 64 of the radius rod 62 are parallel to all planes intersecting the pivots 57 and 60 of the drag link 58.

A small amount of longitudinal clearance is then provided at 65 whereby the axle 511 with its trunnion 471 is free to slide a short distance longitudinally on the axle pivot shaft 461, the latter being firmly clamped at its opposite ends in the upper split ends of the links 451. Because of this arrangement, as the axle 511 rises or falls, it is caused to move longitudinally about the pivot 64 as a center and to thereby prevent any turning of the spindle 481 about its vertical pivot 55 as the pivot 57 of said spindle swings about the drag link pivot 60 as a center. In actual practice the amount of this longitudinal movement of the front axle is so small, that both the radius rod 62 and clearance 65 may be entirely eliminated without any serious detrimental effect on the steering of the vehicle.

There is one very important factor involved, in any front axle set up, namely the permanence of the caster or the angle in a vertical longitudinal plane of the spindle pivots 55. It is to be noted that, in the present invention, the caster of the steering wheels remains absolutely fixed, irrespective of whether or not a radius rod 62 is used and irrespective of whether the torsion rod 33 becomes either deformed or even completely broken.

This feature of fixed caster angle is also of some importance with respect to the back axle, where it ensures the permanency of the arcs through which the universal joints of the propeller shaft are caused to swing as the axle rises and falls. In the case of both front and rear axles, the construction whereby the caster angle is permanently maintained, irrespective of what may happen to the resilient portions of the spring suspension, also ensures that all torque imposed upon the axles by the brakes is suitably taken care of without the need of any special torque rods for this purpose.

In the case of both the front and the rear axle spring suspensions, the links 45, 451 incline downwardly and outwardly. This arrangement has two distinct advantages. One effect of this angular linkage arrangement is that it causes each end of the body of the vehicle to always tend to centralize itself relatively to the companion axle 51 or 511 as the case may be. This centralizing tendency is caused by the effect of gravity, which may be considered a resilient, downwardly-acting force acting between the body and the roadbed and operating in a manner identical in its effects to a metal spring connecting said body and the roadbed. It is to be distinctly understood that this force tending to centralize each end of the body is of a resilient nature. Because of this fact the body of the vehicle is not subjected to directly connected lateral forces as a consequence of a lateral axle movement. Such a lateral axle movement occurs, for instance, when one end only of the axle is raised or depressed and thereby causes horizontal, lateral-movement components in all parts of the axle except at its momentary axis of rotation in those particular cases where said axis lies within the overall length of said axle. In the conventional spring suspension, all movements of the axle which are lateral with respect to the vehicle as a whole are transmitted directly to the body. Because of the relatively large inertia of the latter, no appreciable lateral body movement actually occurs when such a conventional vehicle is traveling at high speeds and one end of the axle moves up or down. What does occur is that said body is subjected to a sharp lateral rap of considerable force every time the axle moves in any manner other than translationally. This not only seriously impairs the riding qualities of the vehicle but also subjects the body to the succession of forces which in a short period of time loosen all the body bolts and other such fastenings and cause the whole body to rattle.

Another important advantage obtained by the angular arrangement of the links 45, 451 is that it absolutely eliminates wheel tramp. This latter may be broadly defined as a periodic vibration of either axle in a vertical transverse plane, the definition being usually limited to a rotary movement about an axis of rotation located at some point in the axle. In general it may be said that, if one wheel is lifted, and if this movement causes a downward thrust on the opposite wheel, then wheel tramp results. Such wheel tramp is prevented in the present invention by ensuring that the downward thrust of the axle pivot 46 or 461, as the case may be, lies approximately in a plane intersecting the contact of the tire with the road. When such a condition obtains, a vertical upward thrust against one wheel is opposed by a directly opposite force passing through the axle pivot 46 or 461 and hence no downward thrust is imposed upon the opposite wheel as occurs in the conventional spring suspension.

Another very important advantage of the present invention is that all forces tending to twist the frame have been very markedly reduced as compared with conventional spring suspensions. Frame twist may be defined as a torque force applied to one end of the frame, different in direction and intensity from the torque force imposed upon the other end of the frame. In the present invention, when, for instance, one of the vehicle wheels is thrust upwardly, the frame hangers 32, 320 (or 321, 3210) are subjected to a force intersecting the axis of the pivot pin 43 (and adjacent short end of the companion torsion rod 33). Such a force constitutes a torque force imposed upon the adjacent end of the vehicle frame, and this, all by itself, would, of course, cause frame twist. It is to be noted, however, that, at this time, the companion torsion rod 33 is under increased stress by reason of the wheel thrust in question and hence the torque arm 35 is subjected to an increased force which also constitutes a torque force upon the vehicle frame. It is to be noted that this increased force which is imposed upon said torque arm 35 is located at one end of the vehicle while the torque force at the pivot pin 43 is at the other end of the vehicle. Furthermore, the forces are not greatly different in intensity or direction. The result of this condition of affairs is that both ends of the vehicle are subjected to torque forces which do not differ from each other to any marked degree in either direction or intensity, and hence frame twist is very considerably reduced. In other words, when a certain wheel of the vehicle is forced upward, instead of twisting the one end of the vehicle frame as in the conventional spring suspension the present invention provides that the entire one side of the vehicle will be lifted a minute distance, thereby increasing the inertia resistance of the sprung weight to the resilient forces caused by the wheel movement, and very markedly decreasing frame twist and its concomitant twisting and rocking of the body and resulting loosening of the various body fittings.

As to this matter of frame twist, it is to be noted that satisfactory results can only be obtained if the "dead" end of the torsion rod extends toward the opposite end of the vehicle and is positioned beyond the center of gravity of the car. If this condition does not obtain, then both ends of the torsion rod cause torque forces which act in the same general direction and upon the same end of the vehicle and hence cause frame twist. If, as in the present invention, the "dead"

end of the torsion rod is situated beyond the center of gravity of the sprung weight (body) then the forces are acting upon opposite ends of the vehicle and frame twist is reduced.

It is also to be noted in the present invention that the means whereby resilience is effected does not involve any frictional resistance such as occurs in the case of a conventional leaf spring, and hence is free and non-energy absorbing in its action. Also, having no frictional resistance (except bearings which afford no particularly difficult lubrication problems) it does not vary because of change of frictional resistance as in the case of the conventional leaf spring.

No shock absorbers are illustrated in the form of the invention shown in Figs. 1-9. However, it is desirable to employ shock absorbers in connection with this suspension. Nevertheless the riding qualities of a vehicle equipped with the present invention are not seriously reduced even if the shock absorbers become inoperative or are left off altogether. This is in sharp contrast to the ordinary invidually sprung wheel suspension using helical springs, in which case the vehicle receives a terrific wracking and pounding if the shock absorbers become even partially inoperative. In the present invention, it has been found by definite test, that the periodic vibrations of the spring suspension are very rapidly damped out, even in the total absence of shock absorbers. As an example of how marked the dampening action is, a series of tests were run on three types of spring suspension in which the load and displacement were the same and also the maximum metal stress in the respective resilient members. It was found that a helical spring, under these circumstances, would come to rest after 800 vibrations—the leaf spring after 20 vibrations— and the present invention after 5 vibrations. Why the leaf spring should be so superior to the helical spring is easy to understand because of the relatively high friction in a leaf spring even when well lubricated. The significant fact is that in applicant's spring suspension, there is no such leaf spring friction and yet its performance is four times as good as the leaf spring set-up, despite the fact that the frictional resistance of the present invention is not materially different from that of the helical spring, individually sprung wheel set up.

In the present invention, side sway of the vehicle frame can be reduced to any desired extent including zero side sway and even negative side sway. To deal rationally with this question it is highly desirable that we first mathematically split the center of gravity of the car into two components, each component lying in the intersection of a vertical, longitudinal, medial plane with vertical, transverse planes passing through the axes of the companion pair of wheels. Each component of the center of gravity is then the mass which, when the vehicle is steered to the right or left, creates a lateral force which tends to tip its companion end of the vehicle in a lateral direction relatively to the companion. The reason why it is desirable to deal with a center-of-gravity component over each axle individually is because the component over the front axle is usually at a different height above the ground from the center-of-gravity component over the rear axle and hence requires a different arrangement to obtain the same kind and degree of side sway. This side sway should be the same at both ends of the vehicle because otherwise the frame is subjected to twisting forces whenever any side sway occurs.

On this basis, we will now consider the side sway at the front of the vehicle with the spring suspension in normal position as in Fig. 3. If the front center-of-gravity component lies on the line $d$, there results a zero side sway of the frame relatively to the axle when the vehicle is turned to the right or left as, for instance, when rounding a corner. This is because said line $d$ intersects the axis of the axle pivot 46I.

This is believed by the inventor to be a correct statement, but it is admitted that no specific tests have been made to ascertain exactly where the center of gravity must be to obtain zero side sway. However, assuming this relationship, as stated, to be correct, then it follows that if the center-of-gravity component is above the line $d$ the resulting side sway will be positive as in the conventional spring suspension.

If, on the other hand, the center-of-gravity component is situated below the line $d$, as for instance, on line $e$, then the side sway is negative. Obviously the amount of such negative side sway is proportional to the distance between the lines $d$ and $e$. One important feature of negative side sway is that, when rounding a corner, the center of gravity is shifted toward the inside of the curve and hence lessens the possibility of the car turning over. Another distinct advantage of negative side sway is that the tendency of the person or goods in the vehicle to move sidewise under the influence of centrifugal force is lessened. This is because the supporting surface is tilted when the side sway occurs and hence one component of the side sway force is directed perpendicularly downward against said supporting surface. Negative side sway has the further advantage of being much superior as to its psychological reaction on the persons riding in the vehicle as compared with zero or positive side sway, not only because of the decrease in the force tending to move the persons sidewise in their seats, but also because there is a natural tendency for a person to lean inward (or bank) on a curve. This psychological effect is probably chiefly due to the instinctive feeling of greater safety which is obtained when the center of gravity is shifted toward the inside of the curve along which the person is moving.

It is obvious that the amount of side sway varies with the position of the axle pivots relatively to the vehicle frame. When it is desired to keep the maximum possible side sway under any certain definite amount, this may be effected by either positioning the axle pivot high enough above the axle to accomplish this result, or by suitably lowering the center of gravity of the body. It is to be noted in this connection, however, that the factors affecting side sway change very considerably when the frame and axle are approximately in the extreme position of Fig. 8. This is due to the fact that, when the parts are approximately in this position, any outward centrifugal movement of the inner part of the vehicle frame, tends to cause the pivots 43, 44 and 46 to all lie in one straight line, and such a "dead center" tendency is resisted by forces which rapidly approach infinity as said pivots approach a straight line relationship. It should be borne in mind, however, that any such condition as that shown in Fig. 8 would be exceeding rare in actual practice, particularly when the vehicle is equipped with shock absorbers whose chief function is to restrain upward movements of the body relatively to the axle.

It has also been found in the present invention from actual practice and from analysis based on said practice that side sway has been rendered mathematically more negative in amount by reason of the angularity of the links 45 which normally slope down and out from the axle pivots 461. Because of this angularity, when the body shifts laterally in rounding a curve, the outer part of the body is elevated and the inner part allowed to fall, relatively to the axles. Such a tilting is equivalent in its effect to lowering the center of gravity of the body or elevating the axle pivots 461, either of these changes rendering side sway more negative.

It is desirable that when a vehicle is at rest and is carrying whatever load it is intended to carry, the parts be approximately in the "normal" position of Fig. 7. This is because: (A) In this position the smallest initial pressure increments cause the maximum upward axle movement; (B) The total upward axle movement is large enough to properly "cushion" the heaviest upward forces; and (C) The axle can move a considerable amount downward before it reaches the extreme position of Fig. 8. With the construction thus far described, this result cannot be attained if the live load varies considerably in amount as, for instance, in the case of the rear axle of a truck.

Under such circumstances the construction forming the subject of this divisional application and illustrated in Figs. 10–12 may be adopted. In this case the primary torsion member or torsion rod 338 functions precisely as in the other constructions described, being connected at one end with a crank arm 418 and provided at its other end with a torque arm 358, thus imposing a certain definite resilient torque force upon said torque arm 358. This torque force is sufficient to provide suitable riding qualities to the back axle when the truck is entirely unloaded or less than half loaded.

When the truck is completely loaded or more than half loaded, an auxiliary torque force is adapted to be imposed upon the crank arm 418. This is effected by a torsion tube 120 which is suitably journaled on the frame at opposite ends at 121 and 122. The bore of said torsion tube is provided with the bushings 123 and 124 in which aforesaid torsion rod 338 is journaled. The "live" (right) end of the torsion rod 338 is provided with an annular collar 125 having a pressure lug 126 projecting inwardly from one side of its bore. Secured by welding or otherwise to the adjacent end of the torsion tube 120 is a head 127 having a pressure tongue 128 projecting laterally therefrom and adapted to engage with aforesaid pressure lug 126. Secured by welding or otherwise to the "dead" (left) end of said torsion tube 120 is a large sprocket wheel 130 engaged upon its periphery by a belt chain 131. The latter at its inner portion engages with the periphery of a small sprocket wheel 132 secured to one end of a shaft 133. Said shaft is suitably journaled on a bracket 134 secured by a cap screw 135 or otherwise to the frame 308.

Also secured to said shaft 133 is a ratchet wheel 136, the peripheral ratchet teeth of which are adapted to be engaged by a ratchet dog 137 pivoted to the bracket 134 upon a pivot pin 138. A past-dead-center tension spring 140 is connected at 141 to said bracket 134 and at 142 to the ratchet dog 137 and is adapted to either resiliently hold said ratchet dog in or out of engagement with the teeth of the ratchet wheel 136 by reason of the geometric position of the past-dead-center spring connections 141 and 142 relatively to the ratchet dog pivot 138. Said ratchet dog 137 is adapted to be manually thrown either into or out of engagement with said ratchet wheel 136 by a throw lever 143 which is secured to the outboard end of the pivot pin 138.

Secured to the outboard end of the shaft 133 is a crank lever 144 which permits of the convenient manual rotation of said shaft and, through the belt chain 131, of the "dead" end of torsion tube 120. The amount of torsion which can be imposed upon said torsion tube is definitely limited by a stop pin 145 which is secured to the large sprocket wheel 130 and is adapted to come into engagement with the lower face of a stop arm 146 secured by the cap screw 135 to the frame 308. In a similar manner, the extent to which said torsion tube 120 can be manually rotated in a negative direction by the crank lever 144 is limited by a limiting pin 147 also secured to said large sprocket wheel 130 and adapted to come into contact with the upper face of said stop arm 146.

When the truck has been loaded to more than half of its total live load capacity, the operator is enabled, if he wishes to improve the riding quality of the rear end of said truck, to impose a torsional strain upon the torsion tube 120 by first throwing the ratchet dog 137 to the operating position shown in Fig. 11 and then rotating the crank lever 144 in a counterclockwise direction (as seen in said Fig. 11). If the operator wishes to impose a maximum torsional stress upon the torsion tube 120, he continues this rotation until the stop pin 145 comes into contact with the stop arm 146, as shown in Fig. 11. Under such conditions the crank arm 418 is subjected to the torsional stress of both said torsion tube 120 and also the torsion rod 338. When a sufficient negative movement of said crank arm 418 occurs (dropping of the axle to or near the position of Fig. 8) any possibility of imposing a negative stress in the torsion rod 338, and thereby jerking down the vehicle frame is prevented by the torque arm 358 moving away from the frame 308. Similarly, when a sufficient downward axle movement occurs, the pressure lug 126 connected with the crank arm 418 moves out of contact with the pressure tongue 128 of the torsion tube 120, thereby preventing said torsion tube from ever jerking down the vehicle body.

I claim as my invention:

1. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; an auxiliary resilient means; means at the live end of said torsion rod adjacent said crank arm and engaging said auxiliary resilient means following a predetermined stress on said torsion rod; and means for adjustably altering the relation between said engaging means and said auxiliary resilient means to vary the effect of said auxiliary resilient means.

2. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; a torsion tube surrounding a part of said torsion rod; means carried by the live end of said torsion rod adjacent said crank arm and the adjacent end of said torsion tube and arranged to interengage following a predetermined stress on said torsion rod thereby to distribute a greater stress between said torsion rod and torsion tube; means for securing the opposite end of said torsion tube to said frame and means for adjustably altering the relation between said engaging means and said auxiliary resilient means to vary the effect of said auxiliary resilient means.

3. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; a torsion tube surrounding a part of said torsion rod; means carried by the live end of said torsion rod adjacent said crank arm and the adjacent end of said torsion tube and arranged to interengage following a predetermined stress on said torsion rod thereby to distribute a greater stress between said torsion rod and torsion tube; and means for adjustably securing the opposite end of said torsion tube to said frame comprising a sprocket wheel fast to said opposite end of said torsion tube, a second sprocket wheel, a belt chain operatively engaging the peripheries of said sprocket wheels, means for supporting said second sprocket wheel on said frame and means for adjustably rotating said second sprocket wheel.

4. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; a torsion tube surrounding a part of said torsion rod; means carried by the live end of said torsion rod adjacent said crank arm and the adjacent end of said torsion tube and arranged to interengage following a predetermined stress on said torsion rod thereby to distribute a greater stress between said torsion rod and torsion tube and means for adjustably securing the opposite end of said torsion tube to said frame comprising a large sprocket wheel fast to said opposite end of said torsion tube, a small sprocket wheel, a belt chain operatively engaging the peripheries of said sprocket wheels, means for supporting said small sprocket wheel on said frame and manually operable means for adjustably rotating said small sprocket wheel.

5. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; a torsion tube surrounding a part of said torsion rod; means carried by the live end of said torsion rod adjacent said crank arm and the adjacent end of said torsion tube and arranged to interengage following a predetermined stress on said torsion rod thereby to distribute a greater stress between said torsion rod and torsion tube comprising an annular collar mounted on said live end of said torsion rod, a pressure lug projecting inwardly from said annular collar, a head mounted on said adjacent end of said torsion tube and a pressure tongue projecting laterally from said head and adapted to engage with said pressure lug; and means for adjustably securing the opposite end of said torsion tube to said frame comprising a sprocket wheel fast to said opposite end of said torsion tube, a second sprocket wheel, a belt chain operatively engaging the peripheries of said sprocket wheels, means for supporting said second sprocket wheel on said frame and means for adjustably rotating said second sprocket wheel.

6. A vehicle spring suspension comprising: a frame; a spindle having a wheel journaled thereon; a crank arm pivoted longitudinally on said frame; means pivotally connecting the outer part of said crank arm with said spindle; a torsion rod connected at one end to said frame and extending longitudinally of said frame and connected at its opposite end to said crank arm to resist rotation of said crank arm; a torsion tube surrounding a part of said torsion rod; means carried by the live end of said torsion rod adjacent said crank arm and the adjacent end of said torsion tube and arranged to interengage following a predetermined stress on said torsion rod thereby to distribute a greater stress between said torsion rod and torsion tube comprising an annular collar mounted on said live end of said torsion rod, a pressure lug projecting inwardly from said annular collar, a head mounted on said adjacent end of said torsion tube and a pressure tongue projecting laterally from said head and adapted to engage with said pressure lug; and means for adjustably securing the opposite end of said torsion tube to said frame comprising a large sprocket wheel fast to said opposite end of said torsion tube, a small sprocket wheel, a belt chain operatively engaging the peripheries of said sprocket wheels, means for supporting said small sprocket wheel on said frame and manually operable means for adjustably rotating said small sprocket wheel.

ALBERT F. HICKMAN.